No. 773,746. Patented November 1, 1904.

UNITED STATES PATENT OFFICE.

WILLIAM A. IRWIN, OF DALLAS, TEXAS, ASSIGNOR TO PETER C. RUST OF NEW YORK, N. Y.

PROCESS OF MAKING BUTTER.

SPECIFICATION forming part of Letters Patent No. 773,746, dated November 1, 1904.

Application filed June 8, 1903. Serial No. 160,457. (No specimens.)

*To all whom it may concern:*

Be it known that I, WILLIAM A. IRWIN, a citizen of the United States, residing at Dallas, in the county of Dallas and State of Texas, have invented a new and useful Improvement in Processes of Making Butter, of which the following is a specification.

My invention is in the nature of an improved process of making butter designed to increase the yield of the final product and to provide a wholesome, well-flavored, nutritious, and digestible food product for the table that shall utilize all or nearly all of the valuable constituents of the ingredients.

My invention consists in the process hereinafter described, and set forth in the claim.

In carrying out the same I take a half a gallon of cow's milk containing about ten per cent. of cream, which must be about twenty hours old. To this I add a half a gallon of cow's milk of similar richness in cream, which must be about ten hours old, both proportions of milk being taken at a temperature of from 70° to 80° Fahrenheit. To the above combination I add eight pounds of pure butter made from cow's milk or cream and of a temperature of from 70° to 80° Fahrenheit. I then add to the above combination sugar of milk in the proportion of one ounce of the same to each gallon of milk. When this combination is effected, the entire mass is to be churned together for ten minutes, more or less, and at a temperature of from 70° to 80° Fahrenheit. This operation resolves all of the ingredients into a practically homogeneous mass. It is then to be removed from the churn and is worked over to eliminate the superfluous free milk. It is then allowed to cool, and salt is then added to suit the taste and is worked in. If desired, a little harmless coloring-matter, such as annato, may be added during the churning process. The resulting product is a fine-flavored butter possessing the constitution, consistency, flavor, and dietetic value of the best dairy product with the added economic value of a largely-increased yield.

In defining my invention with greater clearness I would state that I am aware that butter has been combined with a certain proportion of milk or milk and cream and the two churned together, and I make no broad claim to this.

Having thus described my invention, what I claim as new, and desire to secure by Letters Patent, is—

The process of making butter herein described, consisting in mixing two proportions of rich milk of ages of twenty and ten hours respectively and of a temperature of from 70° to 80° Fahrenheit, adding an approximately equal weight of pure butter, and a proportion of sugar of milk as described, then churning the mass together at a temperature of from 70° to 80° and working out the superfluous milk and salting substantially as described.

WILLIAM A. IRWIN.

Witnesses:
   S. F. MURPHY,
   A. J. KNIGHT.